United States Patent [19]

Ensenat et al.

[11] Patent Number: 5,321,623
[45] Date of Patent: Jun. 14, 1994

[54] MACHINING APPARATUS WHEREIN ARC LENGTH ALONG A TOOL PATH IS DETERMINED IN RELATION TO A PARAMETER WHICH IS A MONOTONIC FUNCTION OF TIME

[75] Inventors: Ripoll Ensenat, Eindhoven, Netherlands; James A. Sorlie, Stockholm, Sweden

[73] Assignee: U.S. Philips Corporation, New York, N.Y.

[21] Appl. No.: 89,059

[22] Filed: Jul. 8, 1993

Related U.S. Application Data

[63] Continuation of Ser. No. 703,935, May 22, 1991, abandoned.

[30] Foreign Application Priority Data

Dec. 10, 1990 [NL] Netherlands ............... 9002703

[51] Int. Cl.$^5$ ............... G06F 15/46; G05B 19/00
[52] U.S. Cl. ............... 364/474.31; 364/474.29; 318/573
[58] Field of Search ............... 318/573, 561, 567, 568.1, 318/569-571; 364/474.29, 474.31, 474.28, 723

[56] References Cited

U.S. PATENT DOCUMENTS

| 3,882,304 | 5/1975 | Walters ............... 364/474.31 |
| 4,704,688 | 11/1987 | Kamata ............... 364/474.29 |
| 4,773,025 | 9/1988 | Penkar et al. ............... 364/174 |
| 4,794,540 | 12/1988 | Gutman et al. ............... 364/474.29 |
| 5,028,855 | 7/1991 | Distler et al. ............... 318/568.13 |
| 5,140,236 | 8/1992 | Kawamura et al. ............... 364/474.29 |

FOREIGN PATENT DOCUMENTS 0285660 10/1988 European Pat. Off. .
0384925 9/1990 European Pat. Off. .

Primary Examiner—Long T. Nguyen
Assistant Examiner—Thomas E. Brown
Attorney, Agent, or Firm—Leory Eason

[57] ABSTRACT

Machining apparatus wherein the cutting tool is controlled to follow a path defined by successive splines, the geometry of a spline being described as a function of a parameter other than arc length along the spline and which is related to time. At a present position along a spline, the change in such parameter corresponding to a change in arc length is explicitly determined by approximation and used to determine an incremented position on the spline. A desired constant tool speed can thereby be maintained. By using only the first or the first two terms of a Taylor series approximation, a change in the parameter can be explicitly approximated as a linear or quadratic predictor. Alternatively, polynomial or rational approximations may be employed.

5 Claims, 2 Drawing Sheets

MACHINING APPARATUS WHEREIN ARC LENGTH ALONG A TOOL PATH IS DETERMINED IN RELATION TO A PARAMETER WHICH IS A MONOTONIC FUNCTION OF TIME

This is a continuation of application Ser. No. 07/703,935, filed May 22, 1991, now abandoned.

BACKGROUND OF THE INVENTION

1. Field of the Invention

The invention relates to a machining apparatus including a control device for controlling a tool by means of which a part is to be machined on the basis of a predetermined geometry, which control device combines a spline interpolation device with path-determining means for determining a path of the tool on the basis of parametrized splines. The invention further relates to a control device suitable for use in such a machining apparatus.

2. Description of the Related Art

Such a machining apparatus is known from the article "Durchgängiges Spline-Konzept", V. Reetz, Energie und Automation 11 (1989), Special "EMO" 1989, pp. 19–20. This article discloses how for machining complicated parts use is made of spline interpolation in order to be able to describe, in contrast with linear and circular interpolation methods, a part geometry with a minimum number of supporting points. Splines, i.e. polynomials of higher degree, of the third order are used to describe path segments, it being ensured that successive path segments adjoin each other as closely as possible, that is to say that it is ensured that the contour or path to be machined is as smooth as possible. Further, the splines, which are parametrized in terms of arc length, are parametrized so that the spatial speed of the tool to be controlled is substantially constant along the contour to be machined. A spline is then characterized by multi-axis end point coordinates of a path segment, the value of the path parameter at the beginning point of a polynomial (the path length) and the coefficients of the third degree axis polynomials. The calculation of a spline polynomial can be started from a part contour determined by means of a CAD program or from a contour obtained by digitization or scanning. Adaptation of the spline to a contour is effected on the basis of approximation methods, such as a Newton approximation method.

With splines determined in the manner described above, a substantially linear relation will exist between the path covered by the tool and the parameter value, which relation is expressed in terms of arc length. However, in the case of arbitrary splines, such as splines directly originating from a CAD program, such a linear relation will generally not exist. That is to say, the arc length variation, which increases monotonically with an increase of the parameter value, will not increase linearly (at a constant rate) when the parameter value increases linearly. As a result, although the average speed of the tool over a path segment is constant, it is true, the instantaneous speed along the spline varies.

SUMMARY OF THE INVENTION

The invention has for its object to provide a machining apparatus of the kind mentioned in the opening paragraph, in which the path speed is constant even for splines which are arbitrarily supplied to the machining apparatus.

A machining apparatus according to the invention is characterized in that the spline interpolation device is comprises approximation means for determining in a number of steps by approximation an increase of arc length corresponding to an increase of a parameter of an arc length function, and calculation means for deriving control signals for the tool whilst supplying the increase of the parameter to the parametrized splines. By a machining apparatus according to the invention, high machining speeds with a very high machining quality can be attained, that is to say that the machining apparatus provides an optical part with respect to shape and surface quality. Small errors in the approximation may result in small speed errors, it is true, but not in position errors.

The invention is based on the idea that the arc length function can be expressed in terms of an arbitrary parameter. Such a relation then exists between the increase of the arc length and the parameter that upon increase of the arc length the increase of the parameter cannot be resolved therefrom analytically. According to the invention, however, by approximation an explicit relation is obtained between an increase of said parameter and an increase of arc length, the increase of the parameter being predicted with reference to the desired speed along the spline, which speed is the desired distance per sampling step. By substituting the increased parameter value into the spline description, set points are obtained for multi-axis position regulation of the machining apparatus.

A first embodiment of a machining apparatus according to the invention is characterized in that the approximation approximates the integrant of the arc length function at a present position on the spline with a number of terms of a Taylor series development, the increase of the parameter being determined on the basis of the inverse of the approximated arc length function and the desired path speed. If only the first term of the Taylor series development is taken into account, a linear predictor is obtained in a simple manner for the parameter value. Taking into account more terms would make it more difficult to explicitly determine the increase of the parameter.

A second embodiment of a machining apparatus according to the invention, in which it is simpler to determine the increase of the parameter, is characterized in that the approximation approximates the an inverse of a table of arc length function values obtained by calculation on the basis of with a polynomial giving such values, the increase of the parameter being determined on the basis of the polynomial and the desired path speed. Utilizing the a priori knowledge that in the arc length function the parameter monotonically increases and the integrant of the arc length function in the form of an integral has a given shape, the inverse of the tabulated arc length function can be approximated by a polynomial.

A third embodiment of a machining apparatus according to the invention is characterized in that the approximation approximates the parametrized splines in such a manner with rational splines that a substantially linear relation is obtained between the parameter and the arc length function, the increase of the parameter being determined on the basis of the linear relation and the desired path speed. The use of rational splines provides an additional degree of freedom, as a result of which the non-linear arc length function can be transformed into an arc length function which has a linear relation between the arc length and the parameter. Also in the third embodiment, the parameter value can be determined in a simple manner, although the transformation is somewhat cumbersome.

With further refinements of the spline interpolation device according to the invention, an increasing number of spline coefficients can be omitted, as a result of which inter alia shorter control programs are obtained. For example, with a three-axis control, three spline coefficients can be omitted if a smooth speed transition is required at adjoining track segments, that is to say that the first derivative is continuous. The requirement that the path curvature is continuous means that the second derivative at the spline transition is continuous, as a result of which again three coefficients can be omitted. With a third degree polynomial, the remaining third degree coefficients are then given by the workpiece program. It should be noted that such continuity requirements cannot always be imposed because in given cases the part itself imposes discontinuity.

BRIEF DESCRIPTION OF THE DRAWINGS

The invention will be described more fully with reference to the drawings, in which.

DETAILED DESCRIPTION OF THE PREFERRED EMBODIMENTS

Figure 1A:
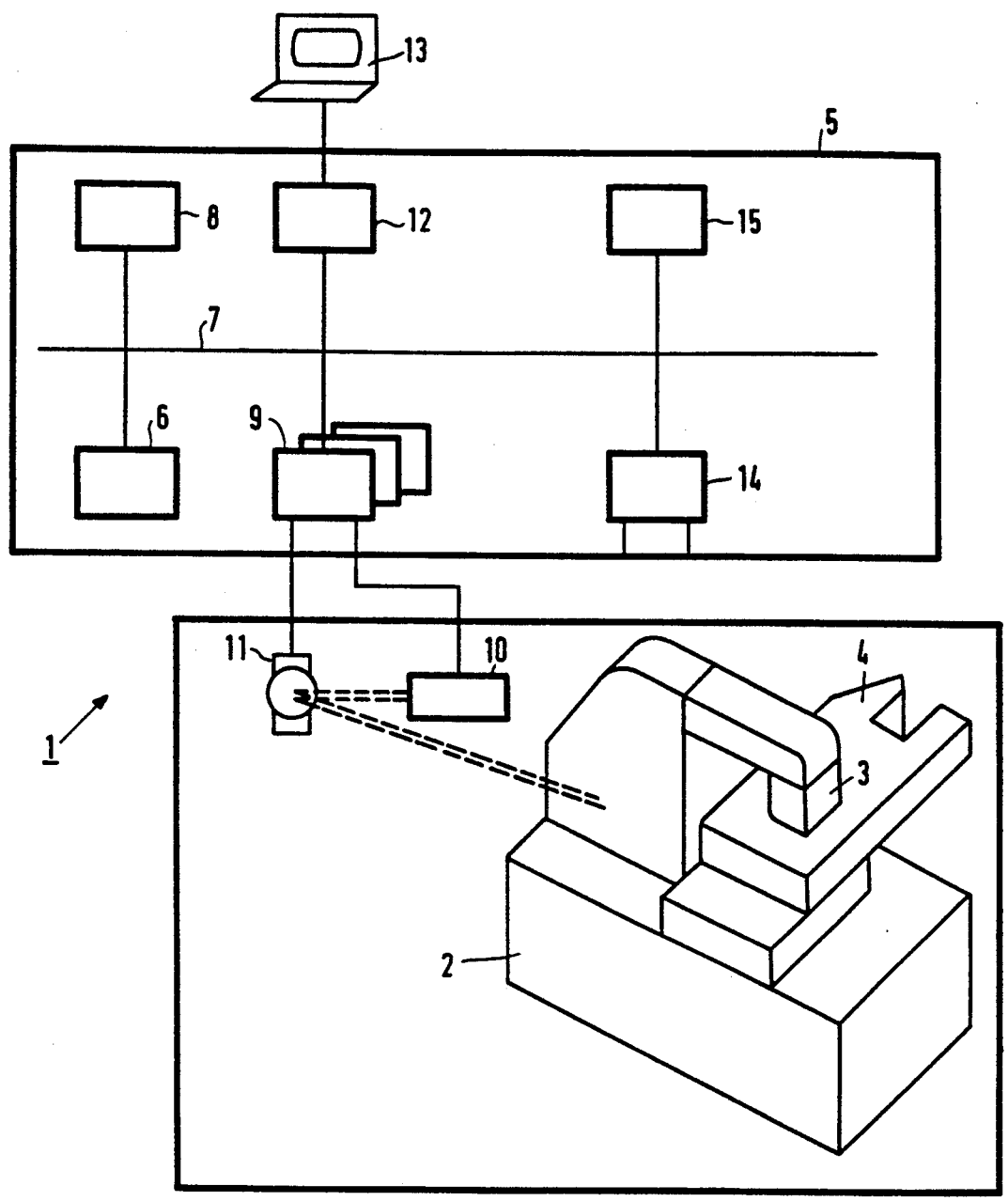
FIG. 1A shows diagrammatically a machining apparatus according to the invention.

FIG. 1A shows diagrammatically a machining apparatus 1 according to the invention comprising a machine tool 2 with a cutting tool 3 for machining a part 4. The machining apparatus 1 further comprises a control unit 5 for controlling the tool 3. The control unit 5 comprises a central processing unit 6, which is connected to an internal bus 7 for exchanging data with further system components, such as a memory 8, a number of input and output means 9 for receiving input signals from measuring means such as a sensor 10 and supplying output signals to an actuator 11, such as a motor. The sensor 10 is inter alia designed to detect variable quantities, such as axis position and axis speed, which are used in an incremental control system for controlling such quantities. Control algorithms for that purpose can be stored in the memory in a manner usual for machining apparatuses, in the form of a program which can be executed by the central processing unit 6. The control device 5 further comprises monitor driving means 12 for driving a monitor with 13 having a keyboard, further input and output means 14 for input and output of further signals occurring in a machining apparatus, such as signals of end-position switches and signals transported via a V24 interface (not shown) from and to a reading and punching device for reading and punching, respectively, a paper tape with data for a part program. A printer and an external computer system may also be coupled to such a V24 interface and a connection with a CAD system may exist for supplying splines. The control unit 5 further comprises a power supply unit 15.

Figure 1B:
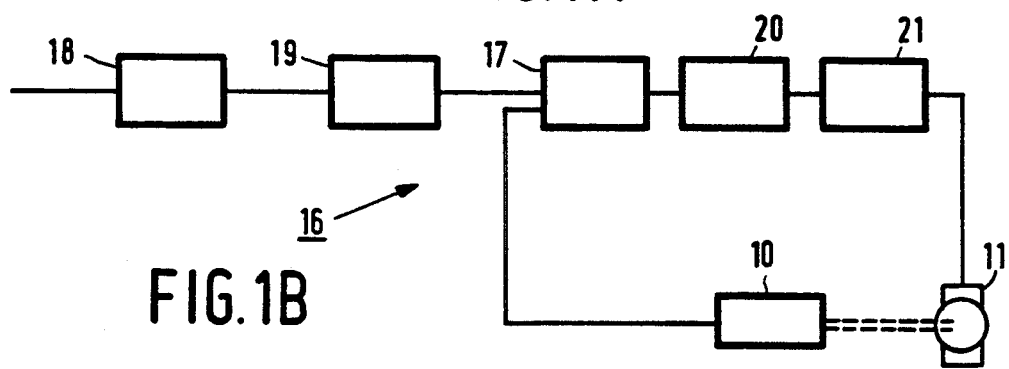
FIG. 1B shows a part of the control of the machining apparatus according to the invention including a spline interpolator.

FIG. 1B shows in block form a part of the control unit of the machining apparatus 1 according to the invention, which part constitutes a feedback loop 16 for regulating an axis of the multi-axis machining apparatus 1. The feedback loop is distributed over the central processing unit 6 with memory 8, the input and output means 9 and the sensor 10 and actuator 11, components in FIG. 1B corresponding to components in FIG. 1A being identified by the same reference numerals. The feedback loop 16 further comprises a comparator 17 for comparing data from the sensor 10 with incremental data supplied by a spline interpolation unit 18 according to the invention via a digital filter 19 to the comparator 17. The comparator 17 in such an incremental control system is in the form of an adder, which supplies an output control signal thereto if there is a difference between the values of the input signals thereto. Further, the feedback loop 16 comprises a digital controller 20, which is coupled at its input to the comparator 17 and at its output to a digital-to-analog converter 21. The spline interpolation unit 18, which may be in the form of programmed means, carries out an interpolation of the predetermined geometry of the part 4 to be machined, which geometry is supplied to the control unit 5. The predetermined geometry can be included in known manner in a so-called part program, which is included in the memory 8.

Figure 2A:
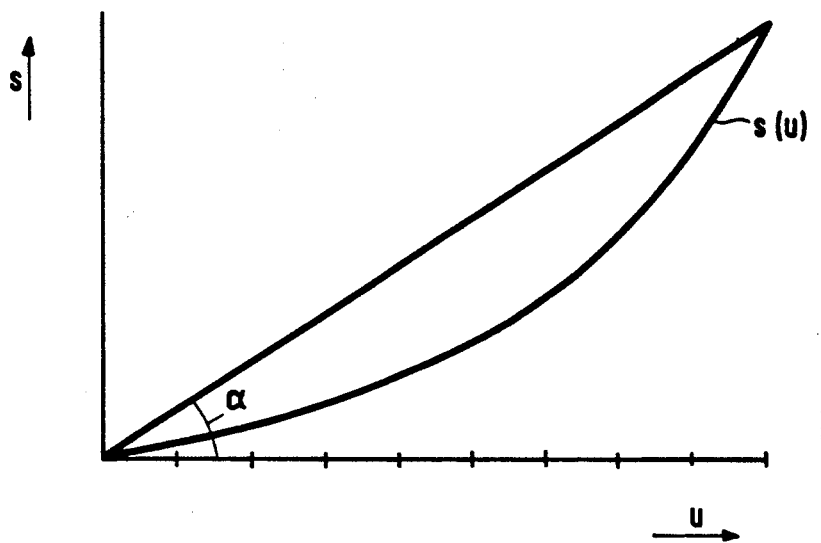
FIG. 2A shows an arc length(s) along a spline as a function of a parameter(u)

FIG. 2A shows an arc length function s(u) along a spline as a function of a parameter u. With a uniform increase of u, the path speed will be too low if $ds/du < \tan\alpha$ and will be too high if $ds/du > \tan\alpha$, even though over the whole machining sequence the average path speed represented by $\tan\alpha$ is equal to the desired path speed. At a desired instantaneous speed along the spline, i.e. a desired increase in distance per sampling step, according to the invention the value of u for a desired $\Delta s$ is determined. On the basis of an approximation, an inverse relation $u = u(s)$ is determined so that $\Delta u$ can be explicitly determined when $\Delta s$ is given.

Figure 2B:
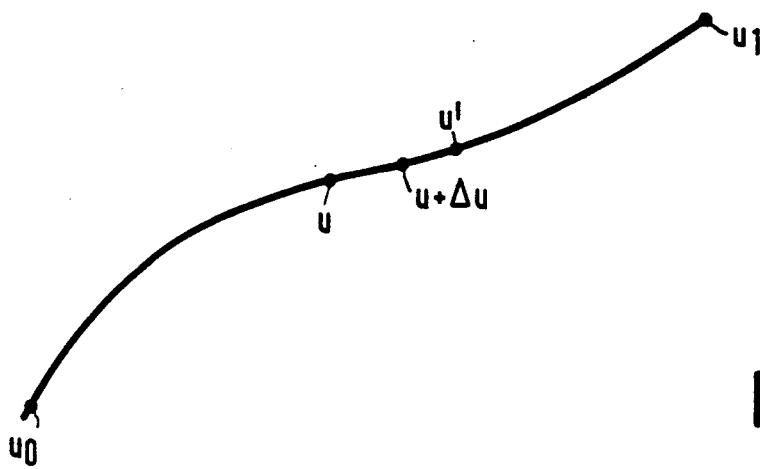
FIG. 2b shows, for explanation, a spline derived by spline interpolation according to the invention.
Figure 3:
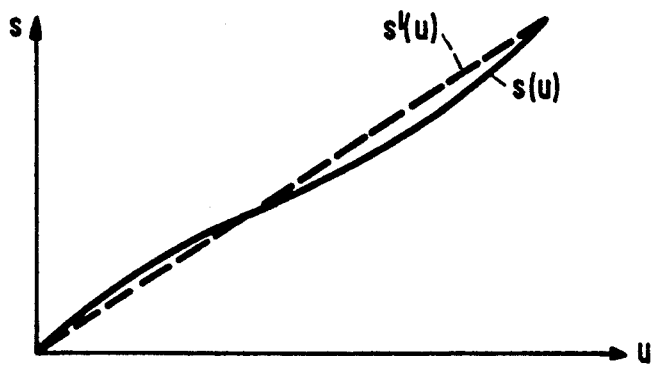
FIG. 3 shows the approximation of an arc length function by means of rational splines.

FIG. 2B shows a spline with an arbitrary parameter u along it. For a path segment between $u = u_0$ and $u = u_1$, from the point $u = u0$ to the point $u = u0 + \Delta u$, $\Delta u$ is to be estimated so that an interpolated tool path between those points is traversed at a constant speed. The estimation error does not give rise to a position error, but a speed error may occur. According to the invention, an approximation is aimed at determining an increase of the parameter u in such a manner that a desired increase in distance s will be attained along the tool path. The approximation is started from an integral expressing the relation between the arc length increase $\Delta s$ and the parameter increase $\Delta u$:

$$\Delta s = \int \left(\frac{ds}{du}\right) \cdot du$$

integrated from $u = u_0$ to $u = u_0 + \Delta u$, where it holds for Cartesian coordinates that:

$$\frac{ds}{du} = \sqrt{\left(\frac{dx}{du}\right)^2 + \left(\frac{dy}{du}\right)^2 + \left(\frac{dz}{du}\right)^2}$$

The aforementioned integral, whose integrant for cubic splines assumes the form of a square root of a fourth degree polynomial, cannot be resolved analytically.

According to the invention, however, the inverse thereof is approximated.

In a first embodiment, $\Delta s$ is approximated by integration of a number of terms of a Taylor series development of the integrant at a present position on the spline, only a finite number of terms of such series being taken. In a simple form of such embodiment only the first term of the Taylor series development is taken, as a result of which, as can be simply verified, $\Delta u$ can be expressed explicitly as follows in $\Delta s$:

$$\Delta u = \frac{\Delta s}{\left(\frac{ds}{du}\right)} \text{ for } u = u_0.$$

This expression represents a linear predictor for $\Delta u$, i.e. an increase of the spline parameter, by determining $ds/du$ for the present position on the spline and dividing $\Delta s$, i.e. the tool feed rate, thereby. With a so-called feed rate overwrite, $\Delta u$ is scaled correspondingly. With two terms of the Taylor series development, a quadratic predictor is found for $\Delta u$. The spline interpolation unit 18 further comprises calculation means for applying the predicted parameter increase $\Delta u$ to a multi-axis spline description, for example a third degree polynomial description, as a result of which the following set points are obtained for the control loop;

$$x = a_x \cdot u^3 + b_x \cdot u^2 + c_x \cdot u$$
$$y = a_y \cdot u^3 + b_y \cdot u^2 + c_y \cdot u$$
$$z = a_z \cdot u^3 + b_z \cdot u^2 + c_z \cdot u$$

in which the coefficients $a_x$, $a_y$, $a_z$, $b_a$, $b_y$, $b_z$, $c_x$, $c_y$ and $c_z$ originate from a part program. Zero$^{th}$ degree coefficients $d_x$, $d_y$ and $d_z$ can be omitted because in practice use is made of an incremental control loop. In order that the calculation can be carried out efficiently, the coefficients are adapted after each calculation, as a result of which it seems as if the spline being machined becomes increasingly shorter. It should be noted that other approximations may also be chosen for the integrant so long as an explicit expression is found for $\Delta u$.

In a second embodiment according to the invention, the function $s=s(u)$ is calculated and tabulated for a number of values of u, and the tabulated inverse $u=u(s)$ thereof is approximated by a polynomial description based on knowledge of the integrant. For each desired $\Delta s$, a $\Delta u$ can be derived from the polynomial description so found, that is to say so that a constant path speed will be maintained.

In a third embodiment, the splines are approximated by rational splines in such a manner that a linear relation is obtained between the approximated arc length functions(u) and the parameteru. Splines as described in the "ordinary" polynomial form are transformed as follows into rational splines:

$$x = \{a_x' \cdot u^3 + b_x' \cdot u^2 + c_x' \cdot u + d_x'\}/$$
$$\{e \cdot u^3 + f \cdot u^2 + g \cdot u + h\}$$
$$y = \{a_y' \cdot u^3 + b_y' \cdot u^2 + c_y' \cdot u + d_x'\}/$$
$$\{e \cdot u^3 + f \cdot u^2 + g \cdot u + h\}$$
$$z = \{a_z' \cdot u^3 + b_z' \cdot u^2 + c_z' \cdot u + d_x'\}/$$
$$\{e \cdot u^3 + f \cdot u^2 + g \cdot u + h\}$$

The desired linear relation can be obtained due to the fact that an additional degree of freedom is attained as a result of the four enumerated spline coefficients. In this embodiment, it is not necessary to calculate $\Delta u$ for successive points on the spline, only one calculation at the beginning of the spline being required.

In the aforesaid embodiments, the spline coefficients may be omitted if the splines of succeeding program blocks are continuous with respect to the first derivation, which has the advantage that the relevant part program may be shorter. If also the curvature of the path is continuous (the second derivative being continuous), further spline coefficients may be omitted. With an incremental control loop, only the coefficients of highest degree are then given by the part program. This holds for cubic splines. Corresponding considerations hold for splines of higher degree.

We claim:

1. A machining apparatus comprising a control unit (5) for supplying control signals to a machine tool (2) to cause it to control a working element (3) of said tool to machine a part (4) in accordance with a predetermined geometry, which control unit includes a spline interpolation unit (18) for determining, on the basis of parametrized splines, a path for the working element (2); characterized in that the spline interpolation unit comprises:

approximation means which, based on a parametrized function s(u) of arc length (s) along a spline in relation to a parameter (u) which is a monotonic function of time, is adapted to calculate by approximation in a series of steps an increment ($\Delta$ u) of the parameter (u) corresponding to an increment ($\Delta$ s) of arc length (s) from a present position on the spline; and computing means for calculating an incremented position on the spline in accordance with the determined increment ($\Delta$ u) of the parameter (u), and supplying control signals to cause the machine tool (3) to control the working element (3) thereof to follow the spline to said incremented position thereon; the speed of the working element (3) along said spline being approximated by $\Delta s/\Delta u$ and thereby being dependent on said monotonic function of time.

2. A machining apparatus (1) as claimed in claim 1, characterized in that the approximation means approximate the integrant of the arc length function (s(u)) at a present position on the spline with a number of terms of a taylor series development, and determine the increase of the parameter ($\Delta u$) on the basis of the inverse of the approximated arc length function and a desired path speed.

3. A machining apparatus (1) as claimed in claim 1, characterized in that the approximation means approximate the inverse of a table of arc length function values obtained by calculation based on a polynomial relating to such values, and determine the increase of the parameter ($\Delta u$) on the basis of said polynomial and a desired path speed.

4. A machining apparatus (1) as claimed in claim 1, characterized in that the approximation means approximate the parametrized splines with rational splines so as to obtain a substantially linear relation between the parameter (u) and the arc length (s) and determine the increase of the parameter ($\Delta u$) on the basis of said linear relation and a desired path speed.

5. A control unit (5) for use in a machining apparatus wherein the control unit supplies control signals to a machine tool (2) to cause it to control a working element (3) thereof to machine a part (4) in accordance with a predetermined geometry, which control unit includes a spline interpolation unit (18) for determining, on the basis of parametrized splines, a path for the working element (2); characterized in that the spline interpolation unit comprises:

approximation means which, based on a parametrized function s(u) of arc length (s) along a spline in relation to a parameter (u) which is a monotonic function of time, is adapted to calculate by approximation in a series of steps an increment ($\Delta u$) of the parameter (u) corresponding to an increment ($\Delta s$) of arc length (s) from a present position on the spline; and computing means for calculating an incremented position on the spline in accordance with the determined increment ($\Delta u$) of the parameter (u), and supplying control signals to cause the machine tool (3) to control the working element (3) thereof to follow the spline to said incremented position thereon; the speed of the working element (3) along said spline being approximated by $\Delta s/\Delta u$ and thereby being dependent on said monotonic function of time.

* * * * *